(12) United States Patent
Byun et al.

(10) Patent No.: US 6,349,604 B1
(45) Date of Patent: Feb. 26, 2002

(54) PARALLEL TYPE SIX-AXES FORCE-MOMENT MEASURING APPARATUS

(75) Inventors: Yong-kyu Byun; Kwang-choon Ro, both of Yongin; Hyung-suck Cho, Daejeon, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/024,151

(22) Filed: Feb. 17, 1998

(30) Foreign Application Priority Data

Feb. 17, 1997 (KR) .............................................. 97-4755

(51) Int. Cl.⁷ ................................................. G01D 7/00
(52) U.S. Cl. ................................................. 73/862.043
(58) Field of Search ........................... 73/133, 862.043, 73/65, 862.54, 862.045

(56) References Cited

U.S. PATENT DOCUMENTS

| | | | |
|---|---|---|---|
| 4,094,192 A | * 6/1978 | Watson et al. ............ 73/133 R |
| 4,099,409 A | * 7/1978 | Edmond ...................... 73/133 |
| 4,132,318 A | * 1/1979 | Wang et al. .................... 73/65 |
| 4,138,884 A | * 2/1979 | Ruoff, Jr. et al. ......... 73/133 R |
| 4,478,091 A | * 10/1984 | Forrester .................. 73/862.54 |
| 5,648,617 A | * 7/1997 | Cullen et al. .......... 73/862.045 |
| 6,166,723 A | * 12/2000 | Schena et al. .............. 354/184 |

* cited by examiner

Primary Examiner—Benjamin R. Fuller
Assistant Examiner—Jewel V. Thompson
(74) Attorney, Agent, or Firm—The Law Offices of Eugene M. Lee, P.L.L.C.

(57) ABSTRACT

A six-axes force-moment measuring apparatus includes a mechanical structure having sensors installed at predetermined positions on the mechanical structure for measuring tensile and compressive forces applied to each axis. The output signal from the sensors is processed and analyzed to determine the forces and/or moments applied to the mechanical structure. The six-axes force-moment measuring apparatus is readily constructed and repaired, and is capable of supporting large loads.

11 Claims, 4 Drawing Sheets

PARALLEL TYPE SIX-AXES FORCE-MOMENT MEASURING APPARATUS

BACKGROUND OF THE INVENTION

1. Field of the Invention

The present invention relates to a force-moment measuring apparatus for measuring forces and moments applied to a structure. In particular, the present invention relates to a parallel type six-axes force-moment measuring apparatus for correctly measuring the magnitude and direction of forces and moments applied to a structure.

2. Description of Related Art

In a conventional parallel mechanism, an end-effector and a base form a closed-loop with two or more parallel links restricting their relative movement. Any load applied to the end-effector is dispersed through the links, thus enabling stable support for large forces.

FIGS. 1 and 1A show a conventional six-axes force-moment measuring apparatus having three sensors 12 and three overload protecting rods 13 alternately and radially provided every 60 degrees around a central hub 11. A cylindrical protecting member 14 is connected to the radially distal ends of the sensors 12 and the overload protecting rods 13. Reference numeral 12s indicates a plurality of strain gauges provided on each sensor 12.

One disadvantage of conventional six-axes force-moment measuring apparatuses is that it is very difficult to machine the mechanical structure. Consequently, noise and non-linear output are caused by mutual interference due to errors machining the sensors 12. Another disadvantage is that when a unidirectional force-moment is applied, conventional apparatuses generate output in other directions. Also, it is impossible to repair a partially damaged conventional apparatus even when only a few parts of the apparatus are damaged. Using conventional apparatuses it is hard to measure large capacities and high loads, and conventional apparatuses for measuring large capacities are too large.

SUMMARY OF THE INVENTION

It is an object of the present invention to provide a parallel type six-axes force-moment measuring apparatus that is easily manufactured and repaired, and in which there is no mutual interference, and which can measure large capacities as well as high loads.

These objects are achieved by providing a parallel type six-axes force-moment measuring apparatus comprising a mechanical structure, a plurality of sensors installed at predetermined positions on the mechanical structure for measuring tensile and compressive forces applied along respective axes, the plurality of sensors outputting a sensor signal; a first signal processor for amplifying the sensor signal, the first signal processor outputting an amplified signal; a second signal processor for converting the amplified signal, the second signal processor outputting a converted signal; a signal analyzer for receiving the converted signal and calculating force and moment forces applied to the mechanical structure; and an output device for indicating the force and moment forces calculated by the signal analyzer.

According to the present invention, each sensor for a respective axis is separately machined, thus it is possible to replace individual sensors. Also, the parallel type structure according to the present invention divides loads sufficiently to measure large capacities.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENTS

Figure 1:
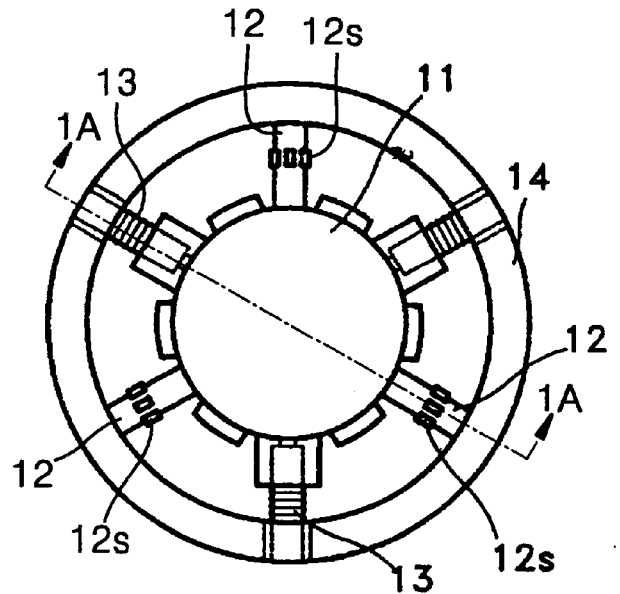
FIG. 1 schematically shows a plan view of a conventional six-axes force-moment measuring apparatus known in the prior art.
Figure 1A:
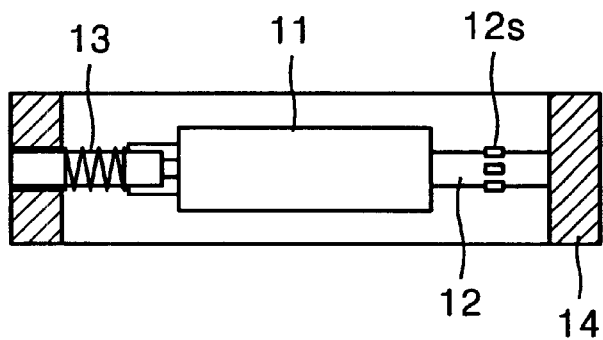
FIG. 1A is a cross-section through line 1A—1A in FIG. 1.
Figure 2:
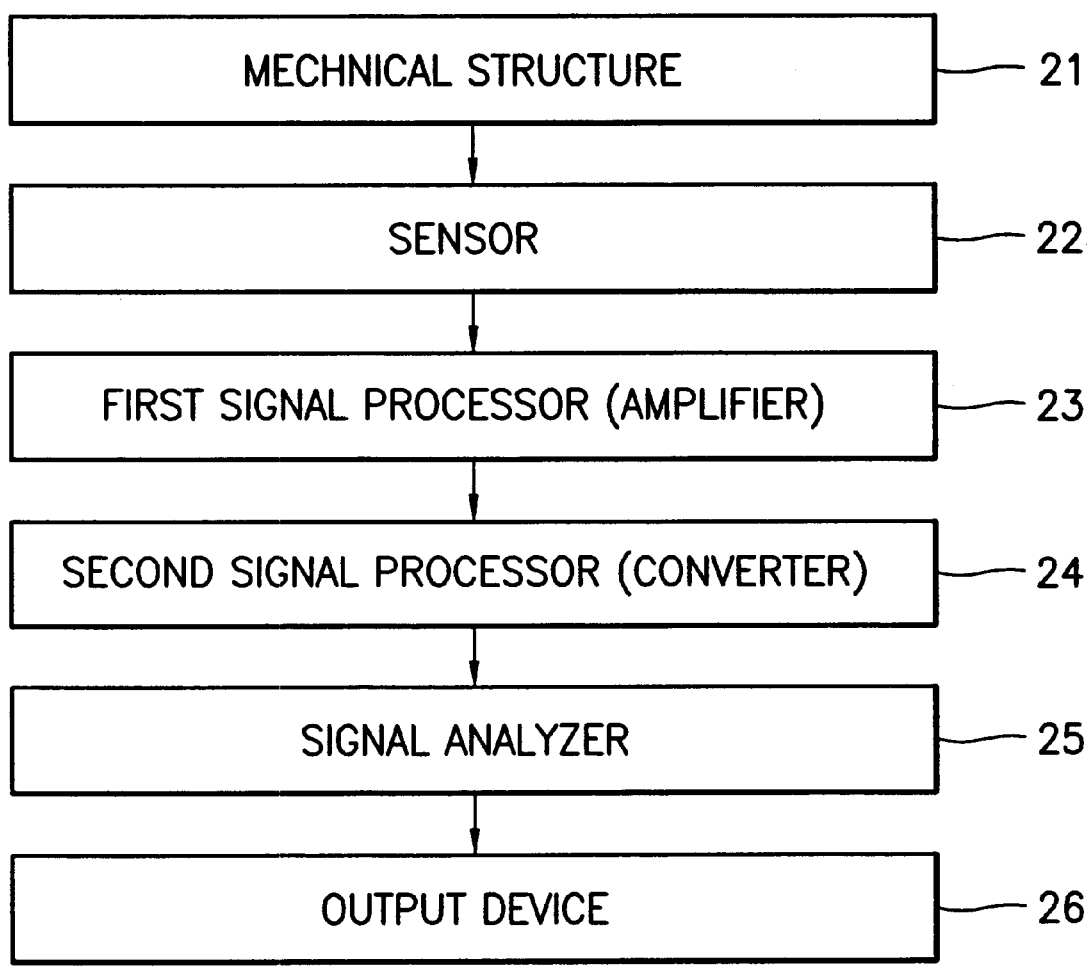
FIG. 2 is a block diagram schematically showing a parallel type six-axes force-moment measuring apparatus according to the present invention.
Figure 3:
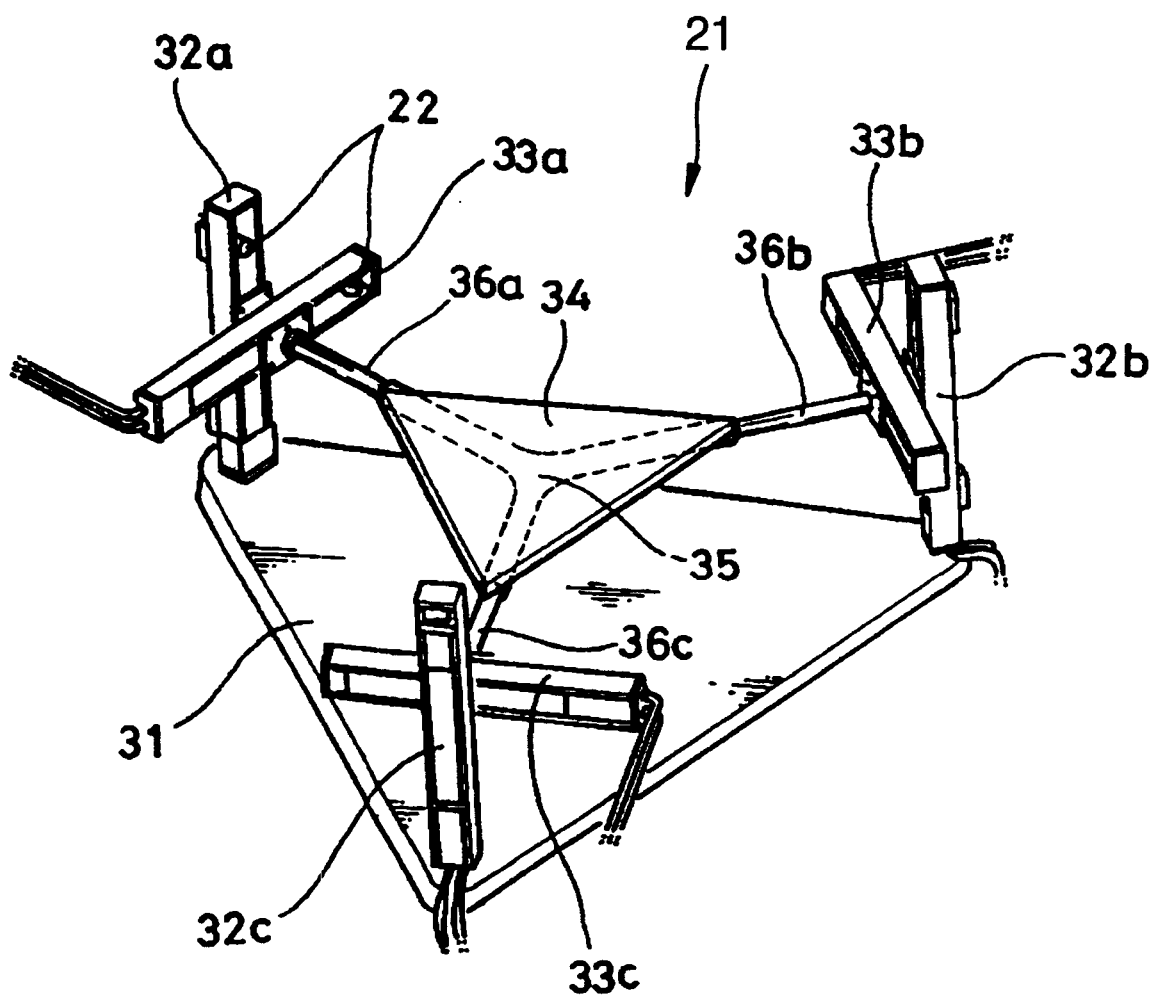
FIG. 3 shows a mechanical structure of the parallel type six-axes force-moment measuring apparatus according to the present invention.

Referring to FIGS. 2 and 3, a parallel type six-axes force-moment measuring apparatus according to the present invention includes a mechanical structure 21 having a plurality of sensors 22 installed at predetermined positions on vertical members 32a, 32b, 32c and horizontal members 33a, 33b, 33c of the mechanical structure member 21. Each sensor 22 measures the tensile and compressive forces applied along the longitudinal axes of their respective members, i.e. the vertical members 32a, 32b, 32c and the horizontal members 33a, 33b, 33c, and outputs a sensor signal.

A first signal processor 23 amplifies the sensor signals input from the sensors 22, and outputs an amplified signal. A second signal processor 24 converts the amplified signal input from the first signal processor 23, and outputs a converted signal, as will be further discussed below. A signal analyzer 25 calculates the forces and moments applied to the mechanical structure based on the converted signal from the second signal processor. The calculated forces and moments from the signal analyzer 25 are indicated by an output device 26. The output device 25 may present the results visually and/or audibly.

FIG. 3 shows a mechanical structure 21 according to the present invention, including a first support plate 31 for supporting the structure. Three vertical members 32a, 32b, 32c extend from the first support plate 31. The distances separating each of the three vertical members 32a, 32b, 32c are predetermined. One of three horizontal members 33a, 33b, 33c is transversely supported with respect to each of the vertical members 32a, 32b, 32c. An inner surface of each vertical member 32a, 32b, 32c and each horizontal member 33a, 33b, 33c commonly face a central axis. A sensor 22 is located along the longitudinal axis of each vertical member 32a, 32b, 32c and each horizontal member 33a, 33b, 33c.

A second support plate 34 is generally parallel with respect to the first support plate 31. The distance separating the first and second support plates 31, 34 is predetermined. The second support plate 34 is engaged by a structure (not shown) and is subjected to forces and/or moments that are to be determined according to the present invention. A spider 35 for supporting the second support plate 34 includes three arms 36a, 36b, 36c for respectively connecting the spider 35 to the three horizontal members 33a, 33b, 33c. The three arms 36a, 36b, 36c are equi-angularly spaced apart from one another at angles of 120 degrees.

A sensor 22 is located along the longitudinal axis of each vertical member 32a, 32b, 32c and each horizontal member 33a, 33b, 33c. The longitudinal distance separating each sensor 22 from a respective one of the arms 36a, 36b, 36c is predetermined.

Figure 4:
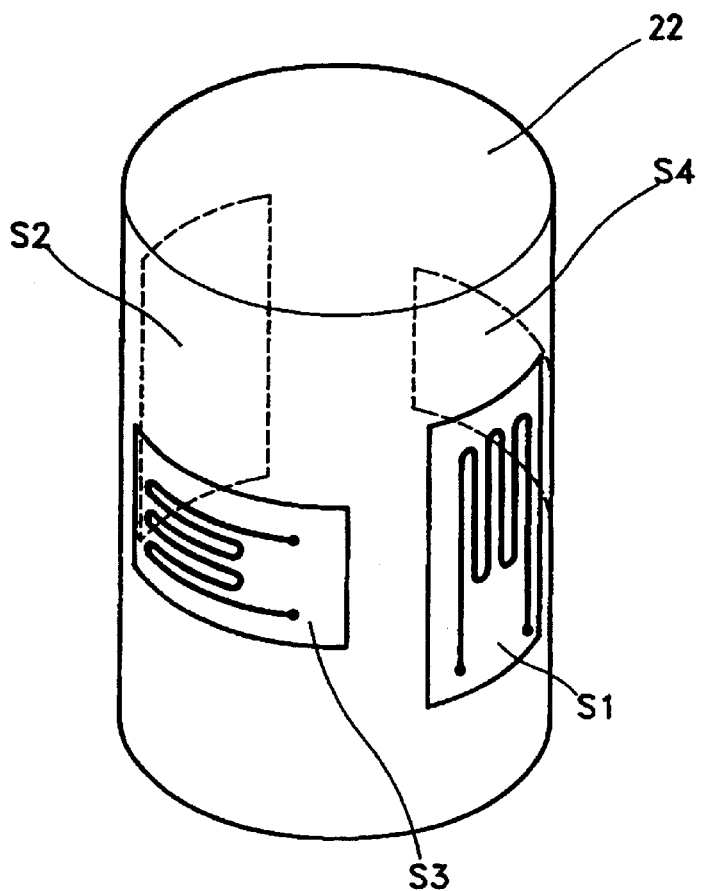
FIG. 4 shows a state of installing a strain gauge of a sensor in the parallel-type six-axes force-moment measuring apparatus according to the present invention.
Figure 5:
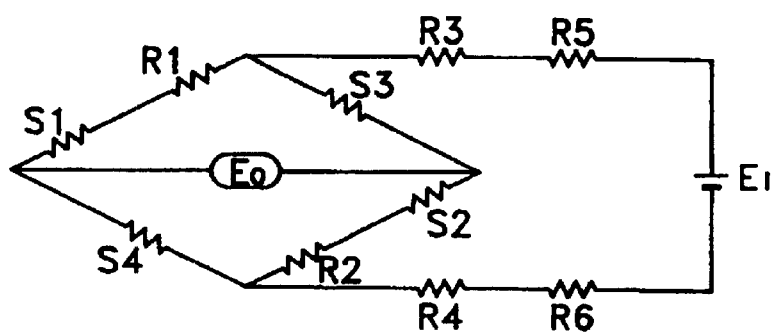
FIG. 5 is a Wheatstone bridge circuit diagram of a strain gauge of a sensor in the parallel type six-axes force-moment measuring apparatus according to the present invention.

Referring to FIG. 4, four thin film type or semiconductor resistance type strain gauges S1, S2, S3, S4 are attached to each sensor 22. The strain gauges S1, S2, S3, S4 are arranged around each sensor at equal intervals and are alternately oriented 90 degrees with respect to the adjacent strain gauges. As is well known, the strain gauges S1, S2, S3, S4 are electrically connected to construct a Wheatstone bridge circuit as shown in FIG. 5.

The second signal processor 24 may be an analog-to-digital (A/D) converter for converting an analog amplified signal from the first signal processor 23 into a digitally converted signal. A microprocessor may be used in the signal analyzer 25 for multiplying the converted signal input to the signal analyzer 25 by a predetermined gain, for performing a Jacobian matrix operation, and/or for calculating forces and moments applied to a structure. A digital indicator may be used as the output device 26.

The operation of the parallel-type six-axes force-moment measuring apparatus according to the present invention having the above-mentioned features will be described as follows.

Arbitrary forces Fx, Fy, Fz and moments Mx, My, Mz are applied to the second support plate 34 relative to statically fixed first support plate 31. Reaction forces to the forces Fx, Fy, Fz and reaction moments to the moments Mx, My, Mz are provided by the mechanical structure 21 and dispersed to each vertical member 32a, 32b, 32c and each horizontal member 33a, 33b, 33c. The reaction forces are divided into tensile and compressive forces along the longitudinal axis of each horizontal member 33a, 33b, 33c and each vertical member 32a, 32b, 32c. Bending, shear and torsion forces are not applied to the sensors 22 due to the arrangement of the vertical members 32a, 32b, 32c and the horizontal members 33a, 33b, 33c.

The tensile and compressive forces applied to the horizontal members 33a, 33b, 33c and the vertical members 32a, 32b, 32c are measured using the thin film type or semiconductor resistance type strain gauges S1, S2, S3, S4. The sensor 22 to which the strain gauges S1, S2, S3, S4 for a respective axis are attached is slightly strained by an external force within an elastic limit. An axial force is measured by the change in resistance of the strain gauges S1, S2, S3, S4 caused by the strain on the sensor 22. This will be explained as follows.

When a force is applied to the longitudinal axis of a vertical or horizontal member, the axis is slightly deformed. A formula for expressing the relationship between the stress σ and the strain rate ε is as follows:

$$\sigma = E\epsilon \tag{1}$$

wherein, E represents Young's elastic coefficient.

Formula (1) can be transformed by defining the stress σ and the strain rate E as follows:

$$\frac{f}{A} = E\frac{\Delta L}{L} \tag{2}$$

wherein f, A, L and ΔL represent an axial force applied to the sensor, the area of the sensor, the length of the sensor before it is strained, and the deformed length of the sensor after it has been strained, respectively.

The four thin film type or semiconductor resistance type strain gauges S1, S2, S3, S4 are strained as the sensor 22 is strained. The resistance value is proportional to the lengths of each strain gauge S1, S2, S3, S4. The resistance R of the resistance type strain gauge is expressed as follows:

$$R = \rho\frac{l}{a} \tag{3}$$

wherein, ρ, l and a represent the resistance of the resistance type strain gauge, the length of the resistance type strain gauge before it is strained, and the area of the resistance strain gauge, respectively. Therefore, when the resistance strain gauge is strained, the change in resistance ΔR with respect to the change in length Δl is as follows.

$$\Delta R = \rho\frac{\Delta l}{a} \tag{4}$$

Dividing formula (4) by the formula (3), $$\frac{\Delta R}{R} = \frac{\Delta l}{l} \tag{5}$$

The strain rate of the resistance type strain gauge Δl/l is. proportional to the strain rate of the sensor ΔL/L, and the gauge factor G is as follows:

$$G = \frac{\frac{\Delta l}{l}}{\frac{\Delta L}{L}}$$

The gauge factor G is 2.0–4.0 for thin film type strain gauges and 50–175 for semiconductor type strain gauges. The greater the gauge factor G, the more sensitive a strain gauge is to strain. For example, a high G strain gauge experiences an appreciable change in resistance even at low strains. Accordingly, it is desirable to attach a high G strain gauge to a material having a higher strength to extend the fatigue life of the strain gauge.

Combining formulas (1) through (6) yields the following expression:

$$\frac{\Delta R}{R} = G\frac{\Delta L}{L} = G\epsilon = \frac{G}{E}\delta = \frac{G}{AE}f \tag{7}$$

Inasmuch as G, A and E are constant physical properties of a material, an applied force can be determined by measuring the change in resistance of a resistance type strain gauge.

Referring again to FIG. 5, S1, S2, S3, S4 are $E_i$ resistance type strain gauges, resistor R1 is used to set a zero point, resistor R2 is used to provide temperature compensation at a set zero point, resistors R3 and R4 compensate the output according to changes in the temperature, $E_o$ is an output voltage according to the change in resistance, and $E_i$ is an input voltage. A relationship between the output voltage $E_o$ and the input voltage $E_i$ is expressed as follows:

$$E_o = \frac{1+v}{2} \frac{\Delta R}{R} E_i \qquad (8)$$

wherein, v is Poisson's coefficient having a value of 0.3.

Combining formulas (7) and (8) yields the following expression:

$$E_o = \frac{1+v}{e} E_i \frac{G}{AE} f \qquad (8)$$

Therefore, the force f applied to a sensor 22 is obtained by measuring the output voltage $E_o$.

The following assumptions are necessary in order to obtain the six-degrees-of-freedom forces and/or moments applied to the second support plate 34 according to the present invention:

1) the shape of a six-axes measuring apparatus mechanism is not changed when an external force is applied; specifically, the first support 31 and the second support 34, including the spider 35, are formed of rigid bodies that experience negligible tension and compression displacement due to the applied forces; and 2) frictional losses are negligible at the respective connections between the spider 35, the vertical members 32a, 32b, 32c, and the horizontal members 33a, 33b, 33c.

Therefore, only tensile and compressive forces are applied in a direction along the longitudinal axes of the vertical members 32a, 32b, 32c and the horizontal members 33a, 33b, 33c.

The principles of six-degrees-of-freedom force and moment measuring with respect to the measuring apparatus according to the present invention will now be described.

According to present invention, the signal analyzer 25 interprets the combination of structural characteristics of the mechanical structure 21 using a Jacobian matrix $J_{ik}$. The relationship between the infinitesimal elastic displacement along an axis caused by a force ($\delta S_i^a$) and the infinitesimal displacement of an end portion of an arm 36a, 36b, 36c ($\delta E$) may be expressed as follows:

$$\delta S_i^a = J_{ik} \delta E \qquad (10)$$

The force applied to a vertical member and a corresponding horizontal member can be expressed as $f_a=(f_{Y1}, f_{Z1}, f_{Y2}, f_{Z2}, f_{Y3}, f_{Z3})^T$ when an arbitrary force and/or moment ($R_E^T$) is applied to the upper supporting plate 34. Therefore, $$f_a^T \delta S_i^a = R_E^T \delta E \qquad (11)$$

which may be rearranged as follows:

$$f_a^T J_{ik} \delta E = R_E^T \delta E \qquad (12)$$

and which yields results as follows:

$$(R_E^T - f_a^T J_{ik}) \delta E = 0 \text{ and } R_E^T = f_a^T J_{ik} \qquad (13)$$

The six-degrees-of-freedom force/moment can be represented by a matrix according to formula (13) as follows:

$$\begin{bmatrix} F_x \\ F_y \\ F_z \\ M_x \\ M_y \\ M_z \end{bmatrix} = [J_{i1} \; J_{i2} \; J_{i3} \; J_{i4} \; J_{i5} \; J_{i6}] \begin{bmatrix} f_{Y1} \\ f_{Z1} \\ f_{Y2} \\ f_{Z2} \\ f_{Y3} \\ f_{Z3} \end{bmatrix} \qquad (14)$$

The arbitrary force (Fx, Fy, Fz) and moment (Mx, My, Mz) are thus calculated by formula (14). Therefore, instead of directly measuring the forces and moments applied to the second support plate 34, the forces and moments can be computed by measuring the output voltage resulting from the change of resistance for each axis and multiplying the output voltage by the Jacobian matrix.

As described above, in the parallel type six-axes force-moment measuring apparatus according to the present invention, each of the vertical members 32a, 32b, 32c and the horizontal members 33a, 33b, 33c is separately machined, and thus easily examined and individually replaced as necessary. Moreover, the present invention makes it possible to manufacture an apparatus having a parallel type structure which sufficiently divides an applied load to measure large capacities.

Additional advantages and modifications will readily occur to those skilled in the art. Therefore, the invention in its broader aspects is not limited to the specific details, and representative devices, shown and described herein. Accordingly, various modifications may be made without departing from the spirit and scope of the general inventive concept as defined by the appended claims and their equivalents.

Korean Patent Application 97-4755, filed Feb. 17, 1997, is hereby incorporated by reference.

What is claimed is:

1. A force-moment measuring apparatus, comprising:
   a mechanical parallel type six-axes force-moment measuring structure including,
      a first support plate providing a static reference frame;
      a plurality of vertical members extending from the first support plate and seperated from one by another a predetermined distance;
      a plurality of horizontal members, each one said plurality of horizontal members being transversely supported with respect to a corresponding one of said vertical members;
      a second support plate being parallel and spaced apart from said first support plate by a predetermined distance, said second support plate being adapted to receive an arbitrary load;
      three connecting arms, each one of said arms connecting said second support plate with a corresponding one of said horizontal members, said arm extend radially from said central axis and are angularly spaced with respect to one another at predetermined angles; and
      a spider commonly connecting each of said plurality of arms at a central axis and for support the second support plate;
   a plurality of sensors installed at predetermined positions on the mechanical structure for measuring tensile and compressive forces along respective axes, said plurality of sensors outputting a sensor signal;
   a first signal processor electrically connected to said plurality of sensor for receiving and amplifying the sensor signal, said first signal processor outputting an amplified signal;

a second signal processor electrically connected to said first signal processor for receiving and converting the amplified signal, said second signal processor outputting a converted signal;

a signal analyzer electrically connected to said second signal processor for receiving the converted signal and calculating forces and moments applied to the mechanical structure; and an output device electrically connected to said signal analyzer for indicating the forces and moments calculated by said analyzer.

2. The force-moment measuring apparatus as claimed in claim 1, wherein said arms are angularly spaced with respect to one another at 120° degree angles.

3. The force-moment measuring apparatus as claimed in claim 1, wherein said plurality of vertical members comprises three vertical members, and each one of the three vertical members is located at a respective apex of an equilateral triangle.

4. The force-moment measuring apparatus as claimed in claim 1, wherein one of said plurality of sensors is provided on each one of said vertical horizontal members.

5. The force-moment measuring apparatus as claimed in claim 1, wherein a set of four strain gauges is supported on each one of said plurality of sensors.

6. The force-moment measuring apparatus as claimed in claim 5, wherein each said set of four strain gauges are electrically connected in a Wheatstone bridge circuit.

7. The force-moment measuring apparatus as claimed in claim 5, wherein each of said strain gauges is a thin film type strain gauge.

8. The force-moment measuring apparatus as claimed in claim 5, wherein each of said strain gauges is a semiconductor resistance type strain gauge.

9. The force-moment measuring apparatus as claimed in claim 1, wherein the second signal processor includes an analog to digital converter for converting an analog amplified signal into a digital converted signal.

10. The force-moment measuring apparatus as claimed in claim 1, wherein said signal analyzer includes a microprocessor.

11. The force-moment measuring apparatus as claimed in claim 1, wherein said output device includes a digital indicator.

* * * * *